United States Patent [19]
Bethards et al.

[11] 4,060,764
[45] Nov. 29, 1977

[54] TRANSCEIVER AUDIO SYSTEM

[75] Inventors: Charles William Bethards; James Edward Andrews, both of Schaumburg, Ill.

[73] Assignee: Motorola, Inc., Schaumburg, Ill.

[21] Appl. No.: 670,501

[22] Filed: Mar. 25, 1976

[51] Int. Cl.² .............................................. H04B 1/40
[52] U.S. Cl. ...................................... 325/18; 333/14; 325/21
[58] Field of Search .................... 325/16, 18, 21, 22, 325/105, 150, 151, 182, 62; 179/1 VL, 1 VC; 333/14

[56] References Cited

U.S. PATENT DOCUMENTS

| | | | |
|---|---|---|---|
| 3,068,415 | 11/1962 | Johnson | 325/105 X |
| 3,441,854 | 4/1969 | Cole | 325/18 |
| 3,470,472 | 9/1969 | Suzuki et al. | 325/18 |
| 3,613,003 | 10/1971 | Kubo | 325/18 |

*Primary Examiner*—Benedict V. Safourek
*Attorney, Agent, or Firm*—James P. Hamley; James W. Gillman

[57] ABSTRACT

A compression amplifier processes both the audio modulating signal to the transmitter, and the audio output from the receiver, in a conventional amplitude modulated transceiver. Unique switching circuitry provides isolation between transmitter and receiver inputs to, and outputs from, the compression amplifier.

11 Claims, 1 Drawing Figure

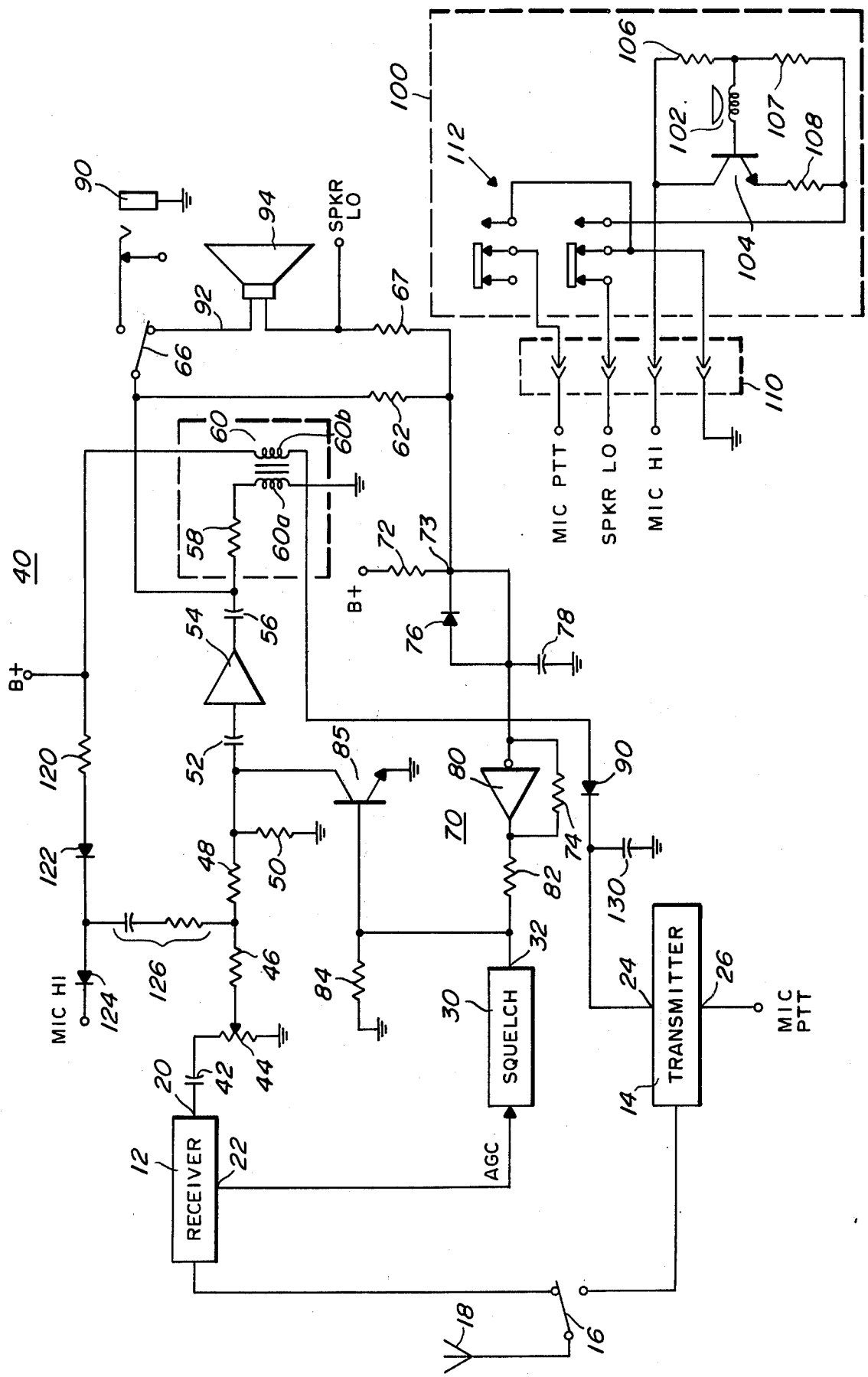

TRANSCEIVER AUDIO SYSTEM

BACKGROUND OF THE INVENTION

The present invention pertains to audio processing systems and, in particular, to an audio processing system for use in an amplitude modulated transceiver. A number of audio amplifier systems for use in radio frequency tranceivers have been developed in the prior art. Such audio systems normally serve two functions. Firstly, the audio system processes the audio output from the tuner portion of the receiver such that the signal is of sufficient magnitude for driving a speaker. Secondly, the audio system is often incorporated in the transmitter, whereby an information signal, such as the signal produced from a microphone input, is amplified through the audio system and used to amplitude modulate a radio frequency carrier signal. Since the audio system is used in both the receive and transmit modes, schemes have been developed for the proper switching of the audio system between the receiver and transmitter.

A problem recognized by prior art audio systems is that the dynamic range of audio signals, such as those originating from a microphone, may produce audio peaks which, when used in amplitude modulated transmitters, result in overmodulation of the transmitter. Overmodulating the transmitter is undesirable since it results in a distorted audio signal as well as the possibility of adjacent channel splatter. This problem may be remedied by reducing the audio modulating signal to the transmitter, but this results in a lower average modulation level of the transmitted signal and thus a smaller effective radiating area of the transmitter.

To remedy the above described problem some prior art transceivers have incorporated audio compressors which compress the audio modulating signal before applying it to the transmitter. As its name implies, the audio compressor acts to reduce the dynamic range of audio source material. Thus, the transmitted signal may be modulated at a higher average level, thereby improving the transmitter's effective radiating area, while maintaining the modulation level below a set maximum limit.

A significant problem heretofore unresolved in the prior art occurs in the transceiver's receive mode. The receiver often processes signals of very weak, then very strong, amplitude. This results in a wide average level of audio signal reproduced by the speaker, which becomes an annoyance to a listener. For example, when tuned to one transmitting station the received signal might be very small and thus the operator would have to increase the volume on his receiver. However, a subsequently received broadcasting station might be received at a very high radio frequency level resulting in not only an extremely loud speaker output, but also possible clipping, and thereby distortion, of the audio stage. While many receivers employ automatic gain control circuitry which tends to minimize this effect, it is still quite a nuisance in conventional radio receivers, since rated audio is commonly measured at 30% modulation while signals may be processed which are near 100% modulation, i.e. a 10db level above the 30% level. Even with an ideal AGC system this can result in overdriving one or more stages of the audio chain thereby resulting in both increased volume and distortion.

SUMMARY OF THE INVENTION

It is an object of this invention, therefore, to provide an improved audio system for use in a radio transceiver wherein the audio signal is compressed in both the receive and transmit modes.

It is a further object of this invention to provide the above described improved audio system for a radio transceiver including improved switching circuitry for switching the receiver and transmitter inputs and outputs to an audio compressor.

Briefly, according to the invention, a radio frequency transceiver includes a receiver portion which recieves and processes radio frequency (RF) signals, producing an output audio signal. A transmitter portion of the receiver produces a modulated radio frequency signal. The transmitter has a modulating signal input for receiving a modulating signal and modulating an RF carrier therewith. Audio compressor means included which receives and predeterminedly compresses audio signals. A switching means switches the transceiver to either the transmit or the receive mode. In the transmit mode, the switching means operates to couple a modulating signal through the audio compressor to the transmitter at the modulating signal input. The switching means operates in the receive mode to couple the receiver produced audio signal through the audio compressor means. In this manner, the audio compressor compresses both the modulating signal to the transmitter and the received audio signal from the receiver.

The switching means includes semiconductor diodes in circuit configuration with the receiver and transmitter connections to the audio compressor whereby the receiver and transmitter are effectively isolated from one another.

BRIEF DESCRIPTION OF THE DRAWING

The single FIG. of the invention illustrates, in schematic diagram form, the improved audio system including audio compressor and switching circuitry for use in combination with an amplitude modulated transceiver.

DESCRIPTION OF THE PREFERRED EMBODIMENT OF THE INVENTION

Referring to the drawing, a conventional transceiver is shown comprised of a receiver 12 and a transmitter 14 which, in the preferred embodiment, are of the amplitude modulated type. An antenna switch 16 couples an antenna 18 to either the receiver 12 or transmitter 14 dependent on the mode of transceiver operation. The receiver 12 operates in the conventional manner receiving and processing radio signals from the antenna 18 and producing output audio signals at its output terminal 20. Also produced by the receiver 12 is an automatic gain control (AGC) signal at its AGC output terminal 22. As is commonly known, the AGC signal assumes a DC level representative of the magnitude of the received radio frequency signal. The output terminal 22 from the receiver 12 couples to a conventional squelch circuit 30. The squelch circuit 30 operates in a known manner in response to the AGC signal to produce a high output at its output terminal 32 in response to AGC level above a particular level, and a low output in response to AGC levels below the predetermined level. Thus for received RF signals in the receiver 12 which are at or above a given level the squelch output terminal 32 assumes a low state. Otherwise, squelch output 32 assumes a high state.

The transmitter 14 is of the amplitude modulated type. Internally of the transmitter 14 is an oscillator and exciter stage which generates a radio frequency carrier. This carrier is amplitude modulated by a modulating signal appearing at the modulated B+ input terminal 24 of the transmitter. The index of modulation of the radio frequency carrier is dependent on the amplitude of the modulating signal at terminal 24. Also indicated is a control terminal 26 to the transmitter 14, which control terminal either activates or deactivates the transmitter in response to a high input, or a low input, respectively, applied thereat.

The receiver 12, transmitter 14, and squelch 30 all connect to the audio amplifier stage 40. The receiver output 20 couples through a DC blocking capacitor 42 to a volume control 44. The tap from the volume control 44 series couples through a pair of resistors 46, 48, a shunt resistor 50, and a capacitor 52 to the input of an audio amplifier 54. The output from the amplifier 54 couples through a coupling capacitor 56 and a limiting resistor 58 both to the primary 60a of a modulating transformer 60. The capacitor 56 couples to one end of a feedback resistor 62. Also coupled, through capacitor 56, to the output of the audio amplifier 54 is a terminal of a public address/speaker switch 66. The remaining free end of feedback resistor 62 connects to the input terminal 73 a compression feedback loop 70 which includes a voltage divider comprised of a resistor 72 and a filter circuit comprised of a diode 76 and a filter capacitor 78. Coupled to the filter capacitor 78 is a feedback amplifier 80, having a feedback resistor 74, which resistor not only controls the gain of amplifier 80 but also provides a DC path to charge capacitor 78 on transceiver turn-on. The output from feedback amplifier 80 is voltage divided by series resistors 82, 84 and applied to the base of an attenuating transistor 85. Transistor 85 couples to the inuput of the audio amplifier 54 and, in response to the level of signal at its base terminal, shunts input signals therefrom to ground. A discussion of the operation of the compression feedback loop 70 is given more fully hereinbelow, and a preferred implementation of a compressor is more fully discussed in U.S. Pat. application Ser. No. 670,505, filed Mar. 25, 1976, invented by Charles Bethards, and assigned to the same assignee as the instant invention.

The modulating transformer 60 has a secondary winding 60b, one free end of which couples to a DC bias potential B+. The other free end of secondary 60b couples through an isolating diode 90 to the modulated B+ input 24 of the transmitter 14. A filter capacitor 130 couples from the cathode of diode 90 to ground potential.

The public address/speaker switch 66 couples the output from the audio amplifier 54 to either a public address jack 90 or to the first terminal 92 of a speaker 94. The speaker 94 has a second terminal which couples through a resistor 67 to the feedback loop 70.

A "MIC HI" imput from the microphone 112 couples through a pair of isolating diodes 122, 124 and an isolating resistor 120 to the source of DC bias potential B+. At the common connection of the two diodes 122, 124 is a coupling network comprised of a series connected resistor and capacitor, which network is of selected component values for coupling an audio signal from the microphone to the input of the audio amplifier 54 when the diodes 122, 124 are forward biased.

Associated with the transmitter 14 is remotely located microphone/switching and control system 100, which is illustrated as a remotely held microphone. This system 100 includes a microphone element 102 the output of which is amplified via a transistor amplifier 104 and a series of bias resistors 106–108. The collector output from the transistor 104 couples to the "MIC HI" output of a cable interconnector 110. The interconnector 110 also includes a wire connected to the ground terminal of the transceiver, which ground connection couples to two terminals of the double pole throw switch 112. Double pole double throw switch 112 is integrally formed in the hand held microphone switching system 100.

The switch 112 is operable in either a receive mode, indicated as position "R" or a transmit mode indicated as position "T". Shown are connections from the switch 112 to outputs labeled "SPKR LO" and "MIC PTT". It should be understood that these outputs, as indicated, connect to the correspondingly marked terminals in the transceiver.

Operation of the audio system may be understood as follows. When the microphone push-to-talk switch 112 is in the receive mode the "MIC PTT" terminal floats thus inactivating the transmitter 14. Similarly, the microphone amplifier stage 104 is removed from ground potential, whereby it is inactivated. With the "MIC HI" terminal floating, the isolated diodes 122, 124 isolate both the microphone 102 and amplifier 54. Thus, audio signals appearing at the output 20 of the receiver 12 are passed via the coupling capacitor 42 and volume control 44, and through the resistors 46 and 48, and coupling capacitor 52 to the audio stage 54 for amplification thereof. The amplified signals appearing at the output of the audio amplifier 54 are coupled either to the public address 90 output, or the speaker first terminal 92 dependent on the position of the public address/speaker switch 66. In the position shown, the signals are passed to the speaker 94 which, through the now grounded speaker second terminal, i.e. "SPKR LO" terminal, which couples the speaker 94 in circuit configuration with the compressor stage whereby the speaker transduces the audio signals to audibility.

Since the transmitter 14 has been inactivated by the switch 112 floating the "MIC PTT" terminal 26 the isolating diode 90 is effectively reverse biased by the voltage on capacitor 78 due to capacitor 78 charging to the peak audio levels, whereby the secondary 60b of modulating transformer 60 is essentially open circuited. This causes the primary 60a of the modulating transformer 60 to assume an extremely high impedance resulting in an insignificant loading on the output of amplifier 54. Thus, the transmitter is effectively isolated from the compressor output.

The audio signals from the audio amplifier 54 are DC rectified by diode 76 and filtered to a resulting DC level by the filter capacitor 78. This DC level is amplified by the feedback amplifier 80 and applied through the divider 82, 84 to the base of transistor 85. For increasing audio signals from the output of amplifier 54, an increasing DC bias is applied to the base of transistor 85 resulting in more shunting of the audio input signal to ground. Thus, peak audio excursions are attenuated resulting in a compressed audio signal. Since the radio receiver produces a varying audio output signal dependent on the level of the received RF signal the audio from the speaker 94, in the absence of the compressor stage, would tend to vary considerably. For weak stations a listener might increase the volume via volume control 44 to a point such that on a subsequently received strong station the speaker output would be annoyingly loud and possibly the amplifier stage 54 would clip resulting in a distorted audio signal. Due to the fact that the compressor is utilized in the receive mode of the transceiver, the resulting signal reproduced by the speaker 94 is less likely to suffer this problem.

The attack knee of the compression system may vary from the transmit to the receive modes dependent on the value of resistor 67. If resistor 67 is deleted from the circuit, the attack knee is the same in both transceiver modes. In the receive mode the push-to-talk switch 112 grounds the second, or "SPKR LO" terminal of speaker 94, thereby preventing the feedback of AC signals through resistor 67 to the input terminal 73 of compression loop 70. In the transmit mode, however, the "SPKR LO" terminal is raised above AC ground, via switch 112, whereby AC signals are fed through resistor 67 to the input terminal 73. This results in the compression amplifier having a lower attack level in the transmit mode. It should be apparent to one of ordinary skill in the art that the exact threshold attack level may be determined by the proper selection of the value of resistor 67. Moreover, it should be clear that the attack level might be varied by any of a number of other ways, such as changing the value of resistor 72, by varying the value of B+ applied to resistor 72, and so on.

When the push-to-talk switch 112 is switched to the transmit mode the transmitter is activated via the "MIC PTT" terminal 26 being grounded. Also, since the mike amplifier transistor 104 is grounded, it is biased to an on state whereby it draws current through isolating diodes 122, 124 from the DC bias source B+. Thus, the impedance of the diodes 122, 124 is very low whereby the microphone 102 signals, amplified via the amplifier 104, are coupled through the coupling network 126 to the input of the audio amplifier 54.

Since switch 112 no longer grounds the second terminal, or "SPKR LO" terminal, of the speaker it is effectively floating whereby it does not load the output from the audio amplifier 54. The amplifier 54 now directly applies the microphone 102 generated signals to the primary 60a of the modulating transformer 60. These signals are transformed through to the secondary 60b of the transformer 60 and applied to the modulated B+ input terminal 24 of the transmitter 14. The index of modulation of the transmitter 14 is dependent on the amplitude of the modulating signal at the transformer secondary 60b.

The instantaneous modulation level should be maintained at or below 100% to minimize distortion and adjacent channel splatter in the modulated signal. However, since the average level of modulation relates to the effective radiating area of the transmitter, it is important that the transmitter be run at a high average index of modulation. Since the compressor loop 70 is included in the transmit mode a substantial increase in the average modulation level, without excessive modulation on peak modulating signals can be accomplished. To further enhance system operation, the limiting resistor 58 is selected to have a value such that peak audio signals from the audio amplifier 54 result in a voltage drop across the resistor 58 which minimizes the peak amplitude swing of the signals appearing in the modulating transformer secondary 60b.

To provide additional filtering against undesirable modulating signal harmonics, and thus channel splatter, the capacitor 130 is selected to form a filter network with the value of the resistor 58 as transformed through the transformer 60. If the transformer 60 is assumed to have a turns ratio A, then the effective resistance appearing at the secondary 60b of the transformer due to the resistor 58 is given as $A^2 \times R$, where R is the value of the resistor 58. In the present embodiment of the invention audio signals, having a bandwidth approximately up to 3300 hertz, are used as the modulating signal, whereby the capacitor 130 is selected to form a low pass filter with the transformed resistance of resistor 58, which filter characteristic has a 3 DB rolloff point at 3 to 5 kilohertz.

Also of note is that the same attenuating transistor 85 which is used as a portion of the feedback loop 70 may also be used by the squelch circuit 30 to mute or unmute the receiver. When the squelch circuit produces a high output at terminal 32, corresponding to the received RF signal below the desired minimum, the attenuating transistor 85 shunts the entire audio signal to ground, since it is in saturation. Otherwise, for RF signals exceeding the set minimum level, the output terminal 32 of squelch 30 is low, whereby the attenuating transistor 85 operates in the linear mode via the feedback loop 70.

As a result of biasing the audio amplifier 54, the input of the compressor feedback loop 70, and the transmitter 14 off of the same DC potential supply (B+), the audio system maintains its desired characteristics over supply B+ variations. This is more fully discussed in U.S. Pat. applications Ser. Nos. 670,502 and 670,505 filed Mar. 25, 1976 both invented by Charles Bethards and assigned to the same assignee as the instant application.

In summary, an audio system has been described which is particularly useful in a radio frequency transceiver in that audio compression is employed in both the transmit and the receive modes. In addition, a switching scheme has been described which isolates the transmitter and receiver inputs and outputs to the audio compressor.

While a preferred embodiment of the invention has been described in detail, it should be understood that many modifications and variations thereto are possible, all of which fall within the true spirit and scope of the invention.

We claim:

1. A radio frequency (RF) transceiver comprising:
   a receiver portion for receiving and processing RF signals and producing an audio signal;
   a transmitter for producing a modulated RF signal, the transmitter having a modulating signal input for receiving a modulating signal and modulating an RF carrier therewith,
   the transmitter including a modulating transformer having primary and secondary windings, the primary winding adapted to receive the modulating signal and the secondary adapted for coupling to the modulating signal input of the transmitter;
   an audio compressor means for receiving and predeterminedly compressing audio signals; and
   switching means for switching the transceiver to either the transmit or the receive modes, the switching means comprising coupling means, operable in the transmit mode, to couple the modulating signal from the audio compressor to the primary of the modulating transformer,
   the switching means operating in the receive mode to couple the receiver produced audio signal through the audio compressor means and further including decoupling means operable in the receive mode to effectively open circuit the secondary winding of the modulating transformer, such that the transformer primary assumes a high impedance, whereby the audio compressor compresses both the modulating signal and the received audio signal.

2. The transceiver of claim 1 wherein the coupling means comprises a resistance means series coupling from the output of the audio compressor to the primary of the modulating transformer, the resistance means of predetermined value to control the peak level of the modulating signal.

3. Transceiver of claim 2 further comprising a capacitor, coupled to the secondary winding of the modulating transformer, for forming a low pass filter, having a predetermined characteristic, the characteristic dependent on the transformed value of the resistor.

4. The transceiver of claim 1 in combination with a speaker means, having first and second terminals, and wherein the switching means operates in the receive mode to couple the output from the audio compressor to the first terminal of the speaker means.

5. The transceiver of claim 4 wherein the switching means further comprises means operable in the receive mode to couple the speaker means second terminal in circuit configuration with the audio compressor such that signals from the audio compressor are transduced to audibility by the speaker means, the switching means operating in the receive mode to decouple the speaker means second terminal from the audio compressor means.

6. The transceiver of claim 1 in combination with a modulating signal source, and wherein the switching means includes coupling means operable in the transmit mode to couple the modulating signal source to the input of the audio compressor means, the switching means effectively decoupling the modulating signal source from the input of the audio compressor when operating in the receiver mode.

7. The transceiver of claim 6 wherein the coupling means is comprised of a diode switch.

8. The transceiver of claim 1 wherein the decoupling means is comprised of a diode switch.

9. The transceiver of claim 1 wherein the switching means comprises means for predeterminedly altering the compression characteristic of the audio compressor dependent on whether the transceiver is in the transmit or receive modes.

10. The transceiver of claim 1 wherein the switching means includes means to vary the attack level of the audio compressor means dependent on whether the transceiver is in the transmit or receive mode.

11. A radio frequency (RF) transceiver comprising:
a receiver portion for receiving and processing RF signals and producing an audio signal,
a transmitter for producing a modulated RF signal, the transmitter having a modulating signal input for receiving a modulating signal and modulating an RF carrier therewith, said transmitter including a remotely located microphone means coupled to said transmitter via a single conductor means, said microphone including an audio preamplifier means operable when activated to amplify signals from said microphone and apply said amplified signals to said single conductor line for transmission thereover, said preamplifier means drawing a quiescent bias current from said single conductor when activated;
an audio amplifier means for receiving and predeterminedly amplifying audio signals; and
switching means for switching the transceiver to either the transmit or the receive modes, the switching means including:
a. diode means for coupling a transceiver located bias supply to said single conductor means for supplying quiescent current to said microphone preamplifier,
b. means for coupling one end of said diode means to said audio amplifier means,
c. means operative in the transmit mode for
1. activating said microphone preamplifier means, and
2. for coupling the audio amplifier to the transmitter modulating signal input, and
d. means operative in the receive mode for coupling the receiver produced audio signal to the audio amplifier means,
whereby in the transmit mode audio signals from the microphone means are coupled through the diode means and to the audio amplifier for supplying a modulating signal to the transmitter and in the receive mode the diode means isolates the audio amplifier from the microphone and single conductor.

* * * * *